United States Patent Office 2,695,301
Patented Nov. 23, 1954

2,695,301

2-(1-METHYL)PYRROLIDYLMETHYL BENZILATE AND SALTS THEREOF

Frederick F. Blicke, Ann Arbor, Mich., assignor to Regents of The University of Michigan, Ann Arbor, Mich., a corporation of Michigan No Drawing. Application December 10, 1952, Serial No. 325,229

5 Claims. (Cl. 260—326.3)

This invention relates to a new basic ester, 2-(1-methyl)pyrrolidylmethyl benzilate, having the formula

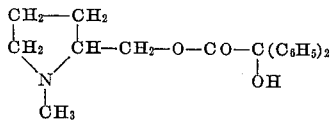

and to acid-addition and quaternary ammonium salts thereof. This invention also relates to a process for preparing these new substances.

2-(1-methyl)pyrrolidylmethyl benzilate and its salts have useful pharmacological properties and in particular are antispasmodic agents having an atropine-like activity.

2-(1-methyl)pyrrolidylmethyl benzilate is readily prepared by heating a 1-methyl-2-halomethylpyrrolidine with benzilic acid or a metal salt thereof, preferably an alkali metal or alkaline earth metal salt. When the free benzilic acid is used a hydrohalide salt of 2-(1-methyl)pyrrolidylmethyl benzilate is formed. When a metal salt of benzilic acid is used the free basic ester is formed directly. The halogen atom of the 1-methyl-2-halomethylpyrrolidine can be chlorine, bromine or iodine, preferably chlorine or bromine. The 1-methyl-2-halomethylpyrrolidine is in turn prepared by treatment of 1-methyl-2-hydroxymethylpyrrolidine with a reagent capable of replacing the hydroxy group by halogen. Such reagents include thionyl chloride, thionyl bromide, phosphorus oxychloride and phosphorus tribromide.

2-(1-methyl)pyrrolidylmethyl benzilate is most conveniently used in the form of acid-addition or quaternary ammonium salts. The acids which can be used to prepare acid-addition salts are preferably those which produce when combined with the basic ester, salts whose anions are relatively innocuous to the animal organism in therapeutic doses of the salts, so that the beneficial physiological properties inherent in the basic ester are not vitiated by side-effects ascribable to the anions. Appropriate acid-addition salts are those derived from mineral acids such as hydrochloric acid, hydrobromic acid, hydriodic acid and sulfuric acid; and organic acids such as acetic acid, citric acid and tartaric acid. The quaternary ammonium salts are obtained by the addition to the basic ester of alkyl or aralkyl esters of inorganic acids or organic sulfonic acids, including such compounds as methyl chloride, methyl bromide, methyl iodide, ethyl bromide, propyl chloride, benzyl chloride, benzyl bromide, methyl sulfate, methyl benzenesulfonate and methyl p-toluenesulfonate.

The following example will further illustrate the invention.

*Example*

(a) *2-carbethoxy-5-pyrrolidone.*—Hydrogen chloride was passed into a mixture of 80 g. (0.54 mole) of glutamic acid and 650 cc. of absolute ethanol until the acid had dissolved. After the addition of 1 liter of absolute ethanol, the solution was refluxed for three hours. The alcohol was then removed under reduced pressure, the sirupy residue dissolved in water, and the solution was neutralized by the addition of solid sodium carbonate. The aqueous mixture was saturated with sodium chloride and extracted with six 100 cc. portions of chloroform. The chloroform solution was dried over anhydrous magnesium sulfate, the solvent removed and the residue dissolved in 400 cc. of xylene. The xylene solution was refluxed for twelve hours, the xylene removed under reduced pressure, and the residue was distilled, giving 52 g. (65%) of 2-carbethoxy-5-pyrrolidone, B. P. 130–132° C. (1 mm.) of 172–175° C. (11 mm). When the product was cooled and rubbed it solidified, M. P. 54–56° C.

(b) *2-hydroxymethylpyrrolidine.*—Lithium aluminum hydride (28.8 g., 0.72 mole) and 500 cc. of ether were placed in a 2 liter, 3-necked flask fitted with stirrer, condenser and a dropping funnel. The mixture was cooled in an ice-bath, stirred, and 53 g. (0.36 mole) of 2-carbethoxy-5-pyrrolidone dissolved in 500 cc. of ether was added dropwise. After the addition, the mixture was stirred and refluxed for twelve hours. The flask was cooled in an ice-bath, the mixture stirred, and 50 cc. of water was added dropwise. The mixture was filtered through a sintered glass filter, and the ether-insoluble material washed with ether. The ether solution from the filtrate and washings were combined, the solvent removed from the solution and the residue distilled, giving 20 g. (56%) of 2-hydroxymethylpyrrolidine, B. P. 96–98° C. (14 mm.).

The hydrochloride of 2 - hydroxymethylpyrrolidine which is somewhat hygroscopic, melted at 57–58° C. after recrystallization from an isopropyl alcohol-ethyl acetate mixture.

The methiodide of 2-hydroxymethylpyrrolidine precipitated gradually after methyl iodide had been added to an ethereal solution of the base. It had the M. P. 286–288° C. (dec.) after recrystallization from isopropyl alcohol.

*Analysis.*—Calcd. for $C_6H_{14}ONI$: N, 5.76; I, 52.20. Found: N, 5.70; I, 52.03.

(c) *1-formyl - 2 - hydroxymethylpyrrolidine.*—Chloral (66 g., 0.45 mole) was added dropwise to 45 g. (0.45 mole) of 2-hydroxymethylpyrrolidine. The mixture was stirred for two hours at room temperature and then heated on a steam-bath for thirty minutes. The chloroform was evaporated off and the residue distilled, giving 54 g. (93%) of 1-formyl-2-hydroxymethylpyrrolidine, B. P. 122–124° C. (0.5 mm.).

*Analysis.*—Calcd. for $C_6H_{11}O_2N$: N, 10.84. Found: N, 10.74.

(d) *1-methyl-2-hydroxymethylpyrrolidine.*—A solution of 53 g. (0.41 mole) of 1-formyl-2-hydroxymethylpyrrolidine in 250 cc. of ether was added dropwise to a stirred suspension of 16 g. (0.42 mole) of lithium aluminum hydride in 500 cc. of ether at 0° C. The mixture was then refluxed for six hours, cooled to 0° C. and water was added dropwise to decompose excess lithium aluminum hydride. The reaction mixture was filtered through a sintered glass funnel, the solid material washed with ether, and the combined ether filtrates and washings were dried over anhydrous magnesium sulfate. The ether solution was concentrated and the residue distilled giving 38.5 g. (82%) of 1-methyl-2-hydroxymethylpyrrolidine, B. P. 67–69° C. (12 mm.).

The methiodide of 1-methyl-2-hydroxymethylpyrrolidine, prepared in ether solution at room temperature, melted at 293–294° C. (dec.) after recrystallization from isopropyl alcohol.

*Analysis.*—Calcd. for $C_7H_{16}ONI$: N, 5.45; I, 49.36. Found: N, 5.35; I, 49.14.

(e) *1-methyl - 2 - chloromethylpyrrolidine hydrochloride.*—A solution of 13.09 g. (0.11 mole) of thionyl chloride in 50 cc. of benzene was added to 11.50 g. (0.10 mole) of 1-methyl-2-hydroxymethylpyrrolidine dissolved in 50 cc. of benzene. The solution was refluxed for five hours and then placed in a refrigerator for twelve hours. The precipitated solid was collected by filtration, giving 16.0 g. (94%) of 1-methyl-2-chloromethylpyrrolidine hydrochloride. After recrystallization from isopropyl alcohol, with the addition of activated charcoal, the compound melted at 151–153° C.

*Analysis.*—Calcd. for $C_6H_{13}NCl_2$: N, 8.23; Cl, 41.74. Found: N, 8.26; Cl, 41.55.

(f) *2-(1-methyl)pyrrolidylmethyl benzilate hydrochloride.*—A mixture of 8.0 g. (0.035 mole) of benzilic acid, 1-methyl-2-chloromethylpyrrolidine (0.035 mole obtained from 6 g. of the hydrochloride and an equivalent amount of alkali) and 100 cc. of isopropyl alcohol was refluxed for four hours. The solvent was removed, and the residue was covered with dry ether and cooled. The partially solid product was recrystallized from isopropyl alcohol, giving 8.2 g. (63%) of 2-(1-methyl)pyrrolidylmethyl benzilate hydrochloride, M. P. 160–161° C.

*Analysis.*—Calcd. for $C_{20}H_{24}O_3NCl$: N, 3.87; Cl, 9.81. Found: N, 3.88; Cl, 9.82.

2-(1-methyl)pyrrolidylmethyl benzilate hydrochloride was found to be active at a dilution of about 1 part in 50,000,000 in counteracting spasms induced by acetylcholine in isolated intestinal strips.

(g) 2-(1-methyl)pyrrolidylmethyl benzilate can be prepared by treating the hydrochloride salt with an equivalent amount of sodium hydroxide.

(h) 2 - (1 - methyl)pyrrolidylmethyl benzilate methobromide can be prepared by treating 2-(1-methyl)pyrrolidylmethyl benzilate with an excess of methyl bromide in ether solution.

I claim:

1. A member of the group consisting of 2-(1-methyl)-pyrrolidylmethyl benzilate having the formula

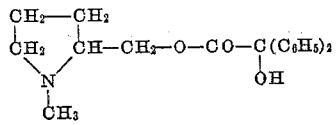

and acid-addition and quaternary ammonium salts thereof.

2. 2-(1-methyl)pyrrolidylmethyl benzilate hydrochloride.

3. The process which comprises heating a 1-methyl-2-halomethylpyrrolidine with a member of the group consisting of benzilic acid and metal salts of benzilic acid.

4. The process for preparing a hydrohalide salt of 2-(1-methyl)pyrrolidylmethyl benzilate, which comprises heating a 1-methyl-2-halomethylpyrrolidine with benzilic acid.

5. The process for preparing 2-(1-methyl)pyrrolidylmethyl benzilate hydrochloride, which comprises heating 1-methyl-2-chloromethylpyrrolidine with benzilic acid.

References Cited in the file of this patent

Renshaw et al.: J. Am. Chem. Soc., vol. 61, pp. 1195–8 (1939).

Brucke et al.: Chem. Abstracts, vol. 33, col. 7886 (1939).

King et al.: J. Chem. Soc., vol. 1947, pp. 164–8.